United States Patent
Lindquist (10) Patent No.: US 7,127,590 B1
(45) Date of Patent: Oct. 24, 2006

(54) RECONFIGURABLE VLIW PROCESSOR

(75) Inventor: Timothy John Lindquist, Thornleigh (AU)

(73) Assignee: Canon Kabushiki Kaisha, Tokyo (JP)

(*) Notice: Subject to any disclaimer, the term of this patent is extended or adjusted under 35 U.S.C. 154(b) by 331 days.

(21) Appl. No.: 09/587,052

(22) Filed: Jun. 2, 2000

(30) Foreign Application Priority Data

Jun. 2, 1999 (AU) .................................... PQ0705

(51) Int. Cl.
*G06F 15/80* (2006.01)
*G06F 15/177* (2006.01)
*G06F 13/36* (2006.01)

(52) U.S. Cl. ..................... 712/29; 712/15; 712/225

(58) Field of Classification Search ............ 712/20, 712/21, 22, 16, 11, 12, 15, 29, 30, 24, 214, 712/219, 18, 25, 225; 708/508, 507, 653, 708/631; 709/221, 236, 244; 710/10, 30, 710/41, 64, 305

See application file for complete search history.

(56) References Cited

U.S. PATENT DOCUMENTS 5,138,615 A * 8/1992 Lamport et al. ............ 370/400
5,237,571 A * 8/1993 Cotton et al. ............... 370/390
5,357,152 A * 10/1994 Jennings, III et al. ...... 708/653
5,359,649 A * 10/1994 Rosu et al. ............ 379/221.07
5,491,694 A * 2/1996 Oliver et al. ............... 370/455
5,781,546 A * 7/1998 Sethu .......................... 370/389
6,112,019 A * 8/2000 Chamdani et al. .......... 712/214

FOREIGN PATENT DOCUMENTS

WO          00/42499          7/2000

* cited by examiner

Primary Examiner—Daniel Pan
(74) Attorney, Agent, or Firm—Fitzpatrick, Cella, Harper & Scinto (57) ABSTRACT

Disclosed is a computer processor (300) comprising a plurality of processing units (FU_n) and communication means (302) by which the plurality of processing units are interconnected. The communication means is dynamically configurable based on a computer program to be processed such that the processing units can selectively be arranged in at least first and second distinct configurations. The first distinct configuration (eg. FIG. 5) has a larger number of the processing units arranged in parallel than the second distinct configuration (eg. FIG. 6), and the second distinct configuration has a deeper pipeline depth than the first distinct configuration.

16 Claims, 4 Drawing Sheets

RECONFIGURABLE VLIW PROCESSOR

FIELD OF INVENTION

The present invention relates to processor architecture, and in particular, to a reconfigurable processor. The invention has been developed primarily for use with Very Long Instruction Word ("VLIW") processors in computer graphics applications in which pipeline processing of streamed data is desirable, and is described herein with reference to this example. However, it will be appreciated that the invention is not limited to use in such applications.

BACKGROUND

In a basic computer system, a single, multi-function processor is typically used to implement all instructions provided by one or more computer programs. The usual way to improve the speed of such a processor is to increase the speed of the clock supplied thereto. However, as is well known in the art, there are physical and material is limitations upon the clock speed at which any particular processor can be driven.

One way of ameliorating such a problem is pipelining, in which each program instruction is broken down into sequential steps required for execution. Such steps can include, for example, fetching an instruction from memory, decoding the instruction, fetching data required for the instruction from memory, executing the instruction using the retrieved data, and writing the result to memory. By implementing each of these steps in a separate processor module associated with the main processor, it is possible to significantly increase the throughput of instructions.

One situation in which pipelining is particularly advantageous is the processing of large amounts of streamed data. An example of this is image processing, in which filtering operations frequently require the repeated application of a particular instruction or instructions to each pixel in an image.

There are also some disadvantages in pipeline processing. For example, the results of a conditional branch instruction will not be known until at least the execution step mentioned above. This means that it is not possible to commence fetching the next instruction until a number of clock cycles have been wasted. When overheads associated with implementing pipelining are taken into account, this architecture can result in less efficiency than a well-designed single processor running at a similar speed.

Another method of increasing the speed at which at least certain types of programs run is to implement a plurality of processor units in parallel. A particular type of parallel arrangement is the VLIW processor, a simple processor architecture in which the instruction for each functional unit is contained within a dedicated field of a VLIW. Such a processor is "simple" because, although it processes a number of operations in parallel, all dependency and scheduling issues are handled by a program compiler, rather than in hardware. However, as with pipelined processors, VLIW processors can be relatively inefficient users of resources when running programs having particular operational characteristics.

In the context of graphics operations, generally the same operation is applied over and over again to each element of an input data stream. Often, the operations applied are complex and composed or expressed by a tree of primitive operations. An example of this is compositing, where several layers of objects are used to provide a final output image. For each output pixel, there is a multi-level compositing tree, made of primitive compositing operators. Likewise, calculation of colour space conversion requires a short computation tree, and convolution requires a hierarchy of multiplications and additions for each output pixel. Unfortunately, single level VLIW processors and single width pipelined processors do not necessarily provide an optimal solution to the need for additional processing speed in such applications.

It is an object of the present invention to provide a processor that overcomes or at least ameliorates one or more of the disadvantages of the prior art.

SUMMARY OF THE INVENTION

In accordance with one aspect of the present invention there is provided a computer processor, comprising a plurality of processing units and communication means by which the plurality of processing units are interconnected, wherein the communication means is dynamically configurable based on a computer program to be processed such that the processing units can selectively be arranged in at least first and second distinct configurations, the first distinct configuration has a larger number of the processing units arranged in parallel than the second distinct configuration, and the second distinct configuration has a deeper pipeline depth than the first distinct configuration.

Preferably the communication means includes a data bus configurable to selectively interconnect the processing units into at least the first and second distinct configurations.

In a specific implementation the processing units include control means for selecting one of a plurality of data reception and transmission modes, the first and second distinct configurations being selectable by altering a control signal provided to each of control means by an instruction controller associated with the computer processor.

Advantageously the data bus is a packet-based bus and each of the processing units is adapted to place data on and take data from the packet-based bus, the first and second configurations being selectable by manipulating packet addressing on the packet-data bus.

Preferably, the program instruction included in the computer program are provided to the processing units in a variable length Very Long Instruction Word (VLIW) format, the configuration of the computer processor being dynamically selected based upon the length of the VLIW. The configuration of the computer processor is preferably executed in accordance with a program compiler. Such an arrangement effectively forms control means and instruction controller that provides a control signal to the processing units to alter the processing configuration thereof.

In an exemplary implementation, where the subject data to be processed by the computer processor includes image data, and the first configuration is used for processing the image data whilst the second configuration is used for processing other data included in the subject data. Preferably, where the subject data to be processed by the computer processor includes image data, the first configuration is used for executing a first type of image processes having no necessity for feed-forward of data calculations whilst the second configuration is used for executing a second type of image processes having a necessity for feed-forward of data calculations. Preferably, where the first type of image processes comprises one of graphic composition, colour space conversion and convolution, and the second type of image processes comprises one of filtering and error diffusion.

In accordance with another aspect of the present invention there is disclosed a method of data processing using a computer processor having a plurality of processing units interconnected by communication means, the method comprising the step of:

dynamically configuring the communication means according to on a computer program to be processed such that the processing units are selectively arranged in a plurality of configurations having a different number of the processing units arranged in parallel and a different number of the processing units arranged in pipelined layers.

Other aspects of the invention will become apparent from a reading of the following detailed description.

BRIEF DESCRIPTION OF DRAWINGS

Known arrangements and preferred embodiments of the invention will now be described, with reference to the accompanying drawings, in which.

DETAILED DESCRIPTION

Prior Art VLIW Processors

A conventional VLIW ("Very Long Instruction Word") processor is composed of a fixed number of functional units arranged as a single static computational layer. It is the job of an associated compiler to extract any potential parallelism from an executed program in order to feed this computational structure. Whist it may appear difficult to extract parallelism from a sequential program, if a speculative execution approach is used, it is frequently possible to obtain a relatively large amount of instruction level parallelism. Speculative execution is a term used to describe the function of executing instructions that are not yet current, in the statistical expectation that these instructions may soon be reached by the flow of the program. A typical scenario involves the forward execution of instructions that are on both possible paths emanating from a branch instruction. Instructions on both paths are executed, but the results are inhibited from being written to registers or memory until it is possible to deduce the actual path to be taken.

A specific example of the extraction or parallelism for a given program will now be described in relation to a tree-based approach used by International Business Machines Corporation (IBM) of the United States. In the IBM VLIW architecture, a program consists of a sequence of tree instructions. A tree instruction is a compound instruction, in the form of a tree, which maps out the flow of a program, dividing into separate paths at each branch point. Operations that lie on the segments between the branches must not have dependencies within the same tree.

In a more formal sense, each tree instruction is a collection of primitive operations that have no dependencies and can be executed in parallel. As a consequence, if there are adequate functional units to process all the primitive operations in the tree in parallel, then the tree represents a single VLIW. The tree instruction corresponds to an unlimited multiway branch with multiple branch targets and an unlimited set of primitive operations.

Where the number of simultaneous branch instructions, or the number of primitive operations, exceeds the resources of the implementation, then the tree can be pruned to smaller sub-trees that execute sequentially. Each such subtree is itself a parallel VLIW.

Figure 1:
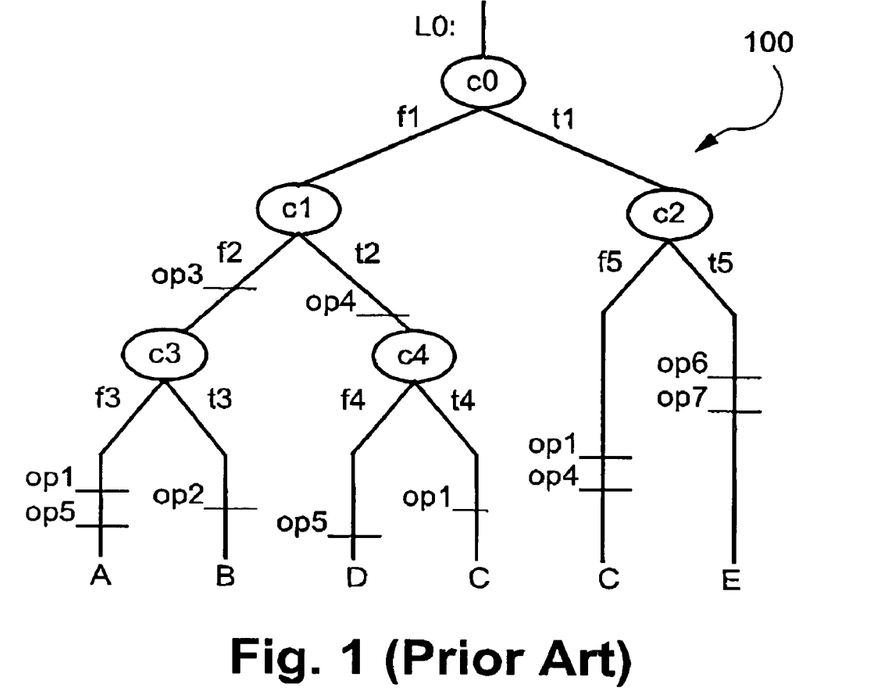
FIG. 1 shows a single tree instruction for use in a known VLIW architecture.

A single tree instruction 100 is shown in FIG. 1. It will be appreciated that, within this tree instruction 100, all operations (op_n) and all branches (A, B, . . . , E) are independent and executable in parallel. Accordingly, based on an evaluation of any branch condition ($c_n$), the taken path (f_n, t_n) can be determined at execution time. Those operations within the VLIW that are on the taken path are allowed to complete, whilst those not on the taken path are inhibited from committing results to storage or registers.

There will necessarily be some resource wastage in this architecture, because operations are performed speculatively, and only those that actually lie on the taken path have their results committed. Also, only operations without dependencies are allowed within the same tree (that is, within the same VLIW). Once a dependency is detected, then the dependent operation must be placed in a subsequent tree (VLIW).

Figure 2:
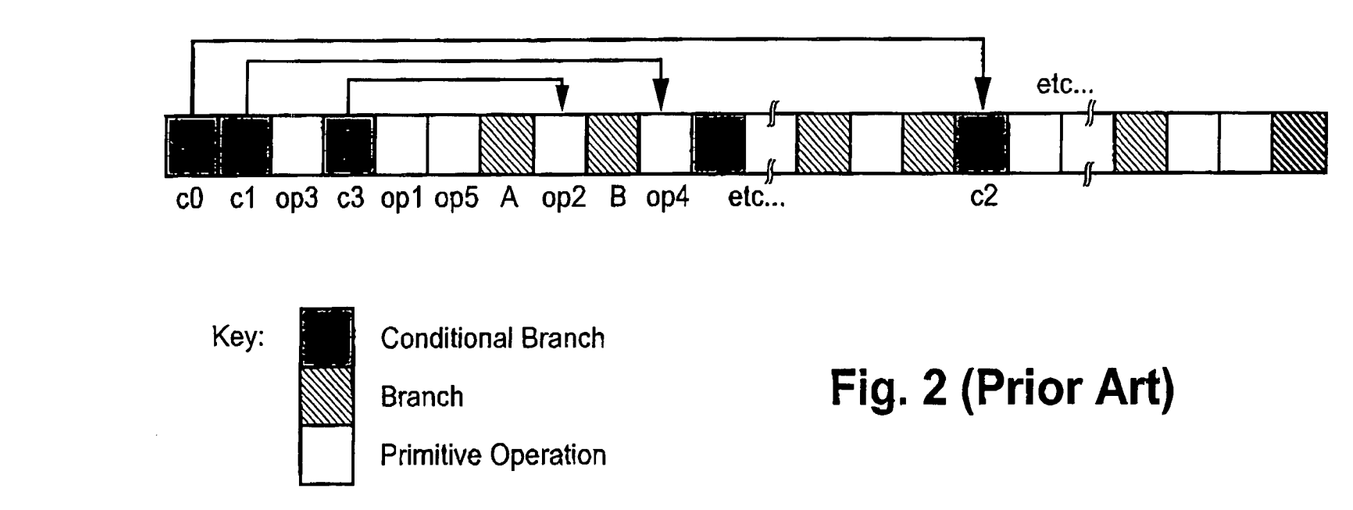
FIG. 2 shows the sub-steps defined by the tree instruction shown in FIG. 1 broken into branches, conditional branches and primitive operations.
Figure 3:
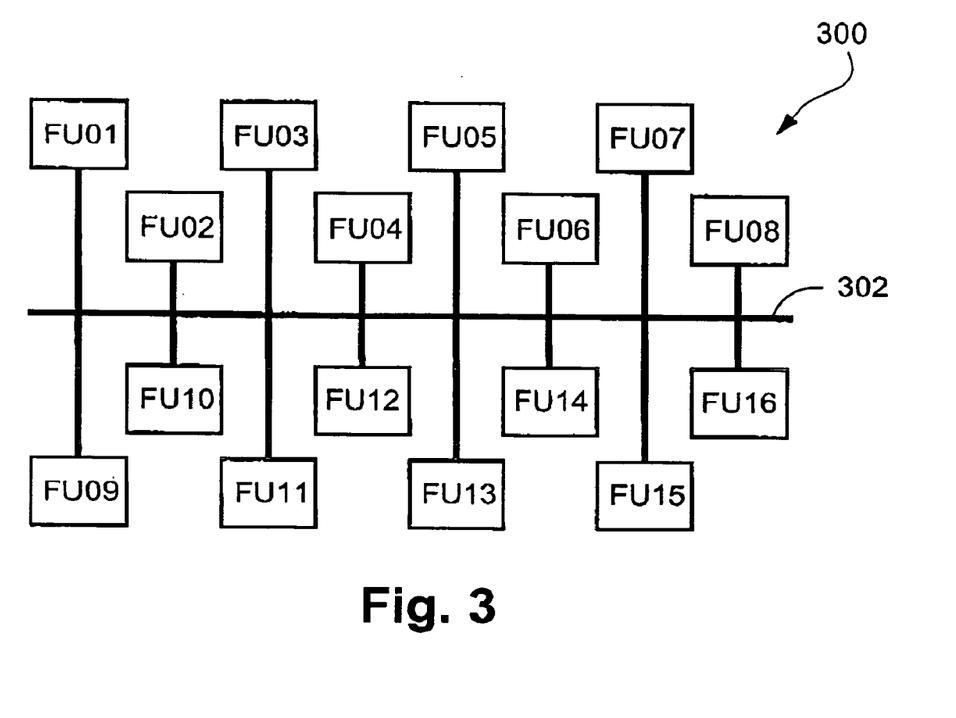
FIG. 3 is a schematic diagram of a plurality of processing units interconnected by a bus, according to a preferred embodiment of the invention.

Turning to FIG. 2, it will be seen that for the tree instructions shown in FIG. 1, twenty-two (22) functional units are required to execute the complete tree instruction in parallel. However, at most 7 units, being c0, c1, op3, c3, op1, op5 and A, for the path L0 to A, actually have results committed. In addition, trees are decomposed where necessary so that sub-trees fit the fixed length of the VLIW implementation. This requires pruning at conditional branch points so that the resultant sub-tree is containable within the VLIW. Where a sub-tree is smaller than a VLIW, the unallocated units are wasted for that cycle.

Preferred Embodiments

In the preferred embodiment, there is provided a plurality on N processing units which can dynamically be configured to any required logical network configuration. The preferred form of each processing unit is an SIMD execution unit. SIMD is an acronym for Single Instruction stream: Multiple Data stream, which is a parallel computer architecture with a single program counter, but for which each instruction applies across multiple data items. Such a unit is similar to an Intel MMX execution unit manufactured by Intel Corporation of the United States and which is incorporated in some PENTIUM (registered trade mark) processors. Such a processing unit is capable of treating a data word as a set of sub-words, to which it uniformly applies the same operation. For example, in the graphics context a 32-bit data word would comprise 4 independent 8-bit channels. The processing units would then apply the same operation to each channel concurrently.

In order to support dynamic reconfiguration of processing units, a flexible interconnecting communication network is required. In a relatively simple implementation, a single unified bus is used to interconnect inputs and outputs of the respective processing units. Such a communication arrangement has the disadvantage that it throttles total system performance, because of bandwidth limitations arising from a single communication channel being time multiplexed between connections. A better, if more complicated, network involves the use of a mesh network. Multiple toroidal meshes, a cross-point network or any other suitable data communication network can alternately be used.

It will be appreciated by those skilled in the art that, for minimum latency, a connection network must provide no more than 3N connections at any point in time for a typical processing unit setup. This is because each of the N processing units requires two inputs and generates one output. A mesh that connects each functional unit with four (4) or more neighbours should, with an appropriate routing algorithm which will be apparent to those skilled in the art, allow simultaneous communication between all active processing unit source and destination combinations with minimal hops. It will be appreciated by those skilled in the art that the specific mesh arrangement (where a mesh is used) can vary from application to application. In particular, in any network, the number of neighbouring functional units to which each functional unit is connected need not be four (4), and indeed, can be any suitable predetermined number for a given application for example, four (4) connections may not be sufficient in some applications, for instance where each functional unit FU requires two (2) inputs and one (1) output. In such cases having one additional communication channel may not be sufficient, unless that channel is multiplexed.

Notwithstanding its disadvantages, the unified bus embodiment is relatively easy to conceptualise in operation, and provides a simple implementation in situations where some system degradation is acceptable. A specific example is shown in FIGS. 3 to 6, where a computer processor 300 is shown formed by a number of processing (or functional) units FU01–FU16 each interconnected by a unified bus 302. The bus 302 also connects to storage units, but for simplicity the storage units and their network connections are not shown.

From such a collection of processing units, it is possible to construct any logical network ranging from a single level fixed-width 16-unit VLIW, through to a 16-level deep, 1 unit wide pipeline. In the middle of this range, where a logical network comprising several pipelined stages of VLIWs may be envisaged, it is also possible to have different width VLIWs at each level. However, it will be appreciated by those skilled in the art that, due to instruction fetch and decode issues, all levels in a pipeline structure will usually have an equal number of processing units.

Figure 4:
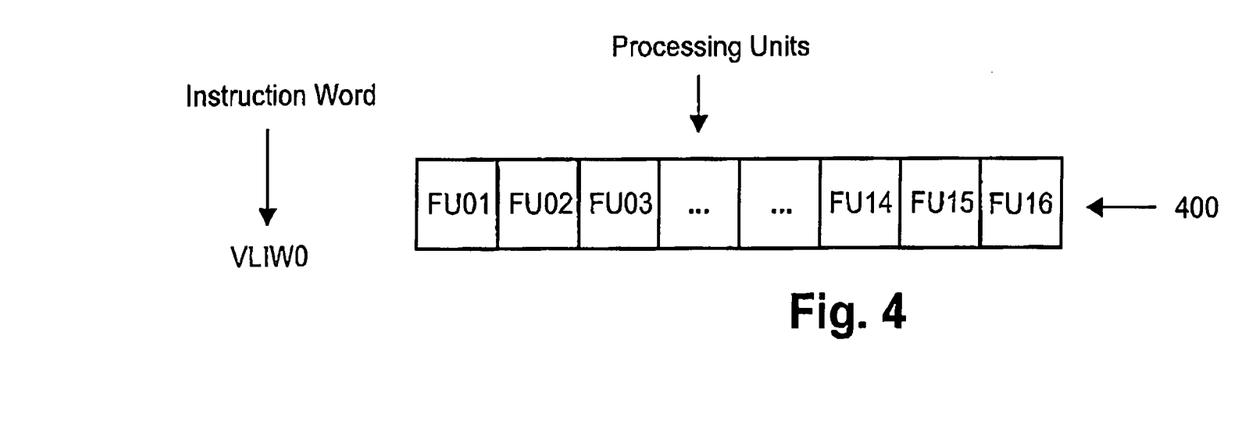
FIG. 4 shows the architecture of FIG. 3 with the processing units arranged in a first configuration.

As shown in FIG. 4, when a plurality of processing units FU01–FU16 are configured to form a single computational layer 400, the processor architecture simulates a standard VLIW processor. In this case, after the execution of an initial VLIW, all processing units must be loaded with new operations for implementing a subsequent VLIW. Only the results from a valid path through the VLIW are committed to memory, as discussed in more detail below under the subheading "Pipelined VLIW's-Parallel Vector Computer".

Figure 5:
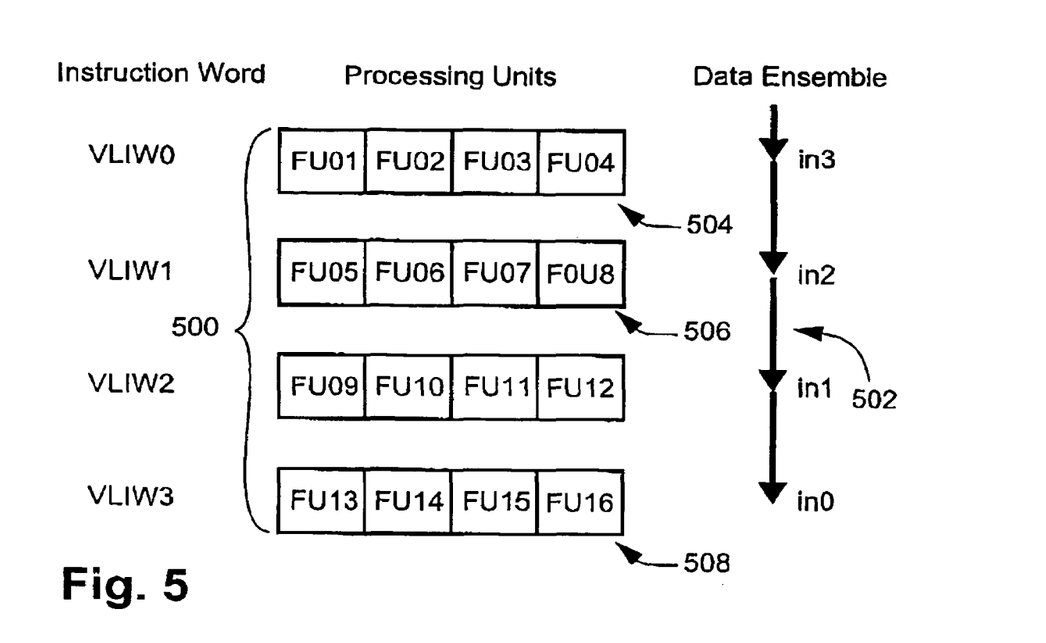
FIG. 5 shows the architecture of FIGS. 3 and 4 with the processing units interconnected to form a second configuration distinct from the first configuration.

Turning to FIG. 5, a second configuration of the processing units FU01–FU16 is shown. In this case, the processing units FU01–FU16 are arranged in a four by four configuration 500, forming a pipeline four units (layers) deep and four units wide (in parallel).

In the case of the pipelined VLIW configuration 500, the functional units of the processor are arranged in a layered network. This configuration offers relatively good potential for computational loops. Data flow 502 through the layers of the pipeline is indicated with respect to corresponding data ensembles that are being processed. As shown, a data ensemble enters a first level 504 and processing begins. The results from the first level 504 feed to a second level 506 whilst data for the second ensemble is accepted by the first level 504. This process is repeated for each subsequent layer in the pipeline until the result is output from a fourth level 508.

The greatest advantage of a pipeline of this construction is obtained when the processing requirements of the loop are satisfied by the available resources, such that data ensembles are processed at the rate of one ensemble per clock cycle. However, longer loops are feasible at reduced throughput by overlaying the loop code over multiple passes through the pipeline discussed in more detail below.

It should be noted that this arrangement requires a special implementation of storage elements (registers), which themselves must assume a quasi-pipelined nature. However, this requirement only applies to a subset of such elements, so the requirement does not lead to a substantial increase in register implementation requirements.

It should also be noted that it is possible to feed multiple data items into the first stage of the VLIW pipeline, so long as the implemented architecture allows for a number of units with load/store functionality. The architecture of the memory access interface will be the determining factor in such an implementation.

Figure 6:
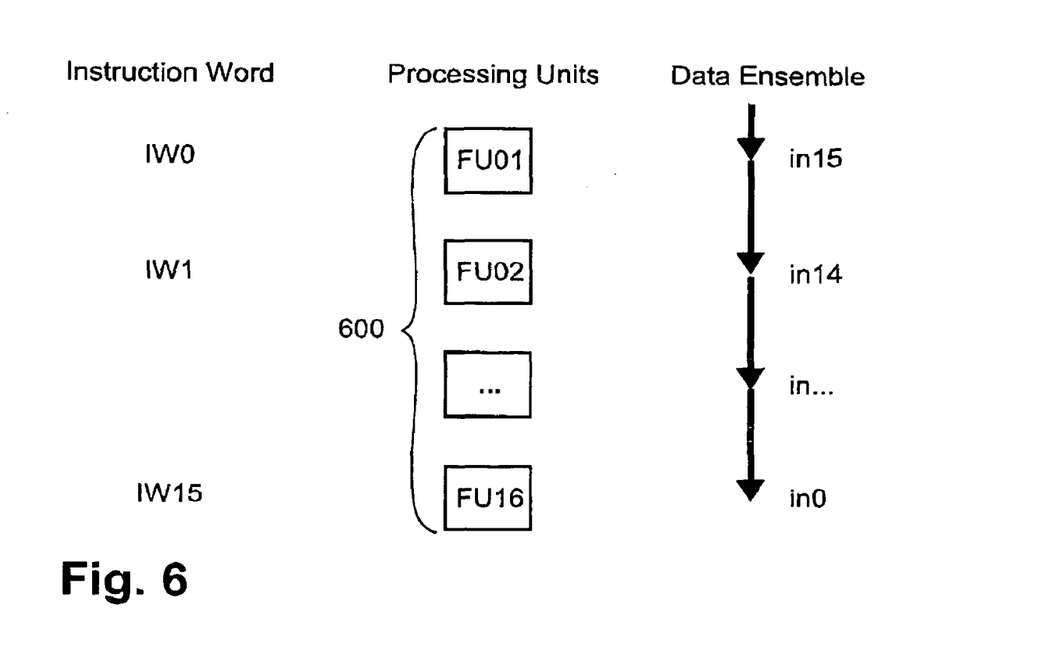
FIG. 6 is a schematic diagram of the processor architecture shown in FIGS. 3 to 5 with the processing units interconnected to form a third configuration distinction from the first and second configurations.

Turning to FIG. 6, if little or no parallelism can be extracted from a program, and particularly where each sequential operation is dependent on the previous operation, it is still possible to arrange the processing units FU01–FU16 as a narrow pipeline 600 and obtain a throughput of one result per clock cycle.

Pipelined VLIWs-Parallel Vector Computing

By configuring the processing units FU1–F16 in a logical network configuration of pipelined VLIWs, such as the arrangement shown in FIG. 5, a parallel vector computer is implemented. Such a configuration is desirable for the processing of computational loops which contain no branching within the loop, and which need to operate on one or more data input streams. It will be appreciated that this arrangement is not limited to short loops that fit within the available number of pipeline levels, although maximum performance is achieved for those loops that do fulfil this constraint. Longer loops are accommodated by wrapping the code over the pipeline stages as the data ensembles pass through each loop segment, in a manner which will be apparent to those skilled in the art.

It is the role of the software compiler to determine the optimal width of the VLIWs. It would be wasteful to implement a four unit wide VLIW if only enough instruction level parallelism can be found to utilize two or three processing units at each level. Provided that the length of the loop warrants such action, it is more advantageous to limit the width of the VLIW thus allowing a greater pipeline depth.

The operation of overlaying loop code segments onto the pipeline array is described in the following VLIW sequence:

| | |
|---|---|
| VLIW0 | mov r0, [r15]: |
| VLIW1 | mov r1, [r15 + 8]: |
| VLIW2 | mov r2, [r15 + 16]: sub r1, r0: |

-continued

```
VLIW3      mov r3, [r15 + 24]: mul r1, r8:
VLIW4      mov r4, [r15 + 256}: sub r3, r2: sra r1, 6
VLIW5      mov r5, [r15 + 264]: mul r3, r8: add r0, r1
VLIW6 ...  mov r6, [r15 + 272]: sub r5, r4: sra r3, 6
VLIW0      mov r7, [r15 + 280]: mult r5, r8: add r2, r3
VLIW1      sub r7, r6: sra r5, 6: sub r2, r0
VLIW2      mul r7, r8: mul r2, r9: add r4, r5
VLIW3      mov r12, [r13]: sra r7, 6: sra r2, 6
VLIW4 ...  mov [r10], r4: add r10, 1: add r15, r7
```

This loop code is twelve VLIWs in length, but the computational capacity of the configuration shown is only seven VLIWs deep. The code wraps back to VLIW0 after the seventh VLIW (VLIW6). This occurs as soon as the seventh data ensemble has progressed through VLIW0. Further ensembles are blocked from entering the pipeline until the current set has completely traversed the loop. The throughput for this example is seven ensembles every 12 clock cycles. The branch condition at the end of the loop is not shown.

Overlaying loop code introduces some complexities into the instruction issue logic, as will be appreciated by those skilled in the art, but this drawback is outweighed by the improved performance.

In the situation where all the loop code can be satisfied by available resources without overlay, the instructions loaded into each processing unit are static for the duration of the complete data set that passes through the pipeline. When overlaying is required, the instructions loaded in the functional units do not change whilst the current data subset is feeding into the pipeline. When the pipeline is full, the VLIWs at the head of the pipeline are issued with new instructions as the last ensemble passes them. This is the process of loop code overlay.

Figure 7:
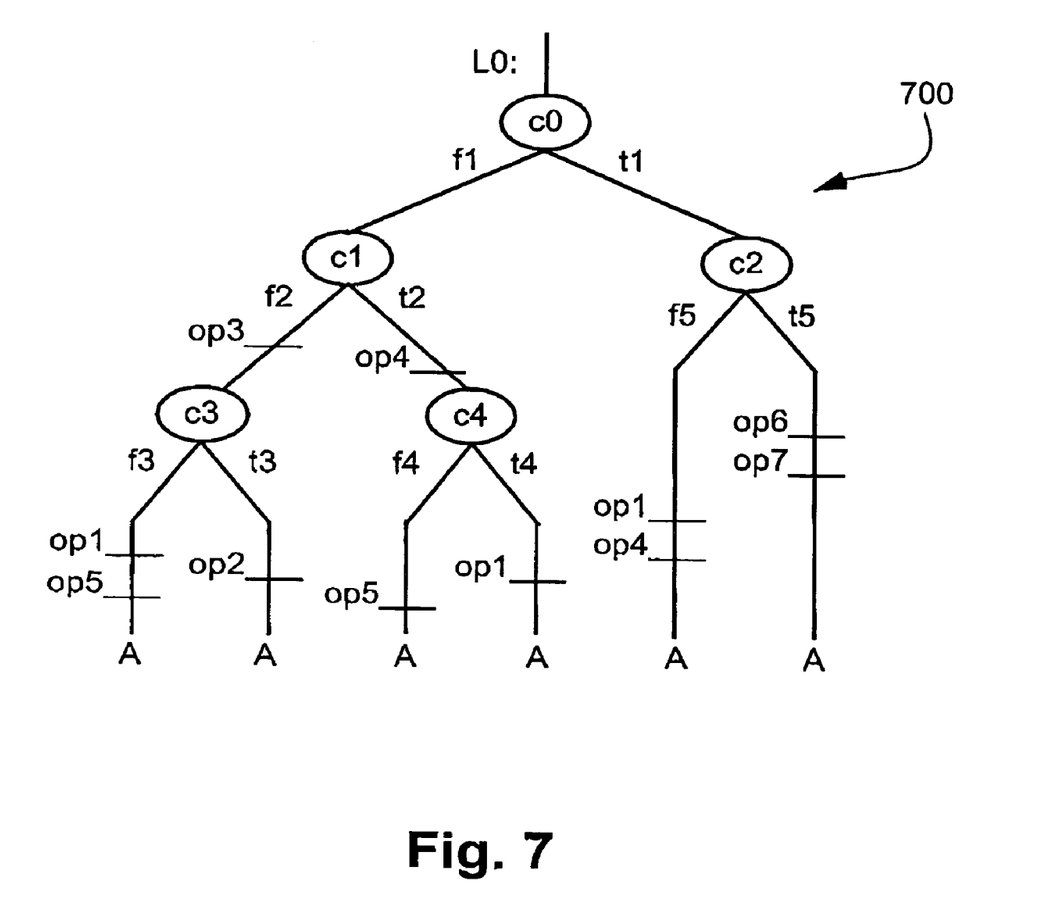
FIG. 7 shows a tree diagram showing a single VLIW spanning 22 functional units, with internal branching.

There are some fundamental requirements for the implementation of pipelined VLIW code. One of the most basic conditions is that there cannot be any change in program flow between VLIWs, for the reason that one cannot implement a pipeline if the pipeline elements change from one cycle to another. However, it is possible to allow changes of program flow within a VLIW itself, but only if such branch paths are completely contained within the VLIW, with all final branch targets pointing at the same target VLIW (see discussion of prior art VLIW architecture above). This represents a condition of small branches from the main path which subsequently rejoin the main path. This is described graphically in FIG. 7, which shows a single VLIW 700 similar to that of FIG. 1, spanning 22 functional units, with internal branching. All branches and paths lead to the same destination "A", which is simply the next VLIW.

Another important condition for pipelining is that, in the course of data flow through the pipeline, storage locations (eg, registers and memory) must be written before they are read, or at least not read before they are written. In effect, this means it is acceptable to read and then write to the same storage locations as an atomic operation within a single VLIW, for operations such as XOR (r1, r1). This condition is the opposite to the case of speculative execution within a VLIW such as in FIG. 1, where storage must be read before it is written, because all the operations execute in parallel.

The implication of this condition is that there should be no inter-loop dependencies. In other words, it is not desirable to pre-compute values for a successive loop iteration whilst performing the current iteration. In the preferred embodiment, where the processor will be used to process graphical operations, there is usually no need for such feed-forwarding of data calculations. For instance, in compositing, colour space conversion, and convolution, the resulting output pixel is not dependent on the previous result. For some image manipulation processes, such as error diffusion, this constraint must be considered. In order to support the pipelined architecture, storage registers must be aliased, such that each ensemble has a private register set, even though the registers for each ensemble are referenced through the same or at least suitably related names.

As an example, assume that there are four levels in the pipeline, so that there is a capacity of four concurrent computation ensembles. Each ensemble has a private register set, so that when an instruction specifies R7, the actual location accessed would be R7_0 for ensemble 0, R7_1 for ensemble 1, and so on. Although this would appear to massively increase the number of registers required, this is not the case because every register must be aliased as many times as there are pipeline levels. For any non-over-laid pipeline, the maximum number of storage locations required is equal to the number of is functional units used in the pipeline multiplied by two inputs per unit multiplied by the number of pipeline levels. For a 4 level pipeline with 16 functional units in an architecture that has 128 nominal registers, only 128 (rather than 128×4–512) actual aliased locations are required. In reality, the total required would normally be less than the maximum number, probably by a factor of one half, because it can be assumed that functional units normally produce results that subsequent pipeline layers operate upon. Accordingly, by using a virtual register allocation scheme for register aliasing, storage requirements are minimised. Each private register set is retained until the associated ensemble has successfully left the pipeline, at which stage it is freed for the ensemble that is in the process of entering the pipeline.

Writes to memory locations will also be pipelined. Write data is only allowed to advance through the pipeline on the completion of the loop, such that all write data for a single iteration is only committed to memory when the iteration is complete. This ensures that pipelined data that lies beyond the loop bounds is not written to memory.

It will be understood that the particular number of processing units is, in the broadest form of the invention, arbitrary. For example, as few as two processing units can be used, configurable between two-by-one and one-by-two arrangements. However, it will also be appreciated that greater efficiencies are usually to be found using larger numbers of processing units.

It will also be understood that the number of available configurations may be as low as two, even where relatively large numbers of processing units (eg. >16) are used. For example, for a particular combination of likely hardware tasks, it may be determined that 20 processor units switchable between a 20-wide VLIW and four wide by five deep pipelined VLIW will provide the best overall performance. In particular, by only allowing a relatively small number of configurations, the communications network required to switch between configurations can greatly be reduced in complexity. However, in some cases, multiple configurations may still be desirable, notwithstanding the added complexity.

EXAMPLE

Where the computer processor 300 having the configurable communication bus 302 as explained above with reference FIGS. 3 to 7, is required to process subject data including image data and data other than the image data (ie. "other" data), the configuration of the bus 302 may be dynamically changed based on a program compiler. Processing or handling of the data involves a (first) number of the processing units FU arranged in parallel, and a (second) number of pipeline layers formed from the parallel units FU.

In some situations, when processing the image data, the first number becomes larger and the second number become smaller in comparison to when instructions for processing or handling the other data are executed. In other situations, the extent of parallelism may be limited by the type of data being processed.

Further, even during handling the image data, the configuration of the bus 302 may be dynamically changed so as to change a number of the processing units arranged in parallel and a number of pipeline layers (pipeline depth). For instance, during instructions for executing an image process having no necessity for feed-forward data calculations, such as graphic composition, colour space conversion and convolution, the first number of the processing units FU arranged in parallel becomes larger than and the number of pipeline layers become smaller in comparison to when during instructions for executing an image process having no necessary for feed-forward of data calculations, such as a filtering and an error diffusion, are performed. The extent to which the configuration may be changed may be constrained by the presence of loops in the processing chain. For example, if an image operation is performed on a loop basis, then the configuration must be held constant or maintained throughout the loop and altered only when the loop is completed.

The preferred embodiment of the invention allows a compiler to configure interconnections between processing units in such a way that processing of different data types is improved. For example, image processing tasks typically benefit from a VLIW architecture, whilst other data processing tasks work most efficiently with particular pipelining depths. By allowing dynamic switching between different VLIW widths and pipelining depths, the present invention offers a commercially significant improvement over prior art multi-purpose processors and specialised single-purpose processors.

The forgoing described only a number of embodiments of the present invention and modifications may be made thereto without departing from the scope of the present invention.

The invention claimed is:

1. A computer processor, comprising:
    a plurality of processing units; and
    communication means including a common bus to which each of the plurality of processing units are interconnected for communication of packetized information over said common bus,
    said communication means being dynamically configurable based on a processing of a computer program to thereby selectively arrange communication paths for said packetized information between the processing units in at least first and second distinct configurations, the first distinct configuration having a larger number of the processing units arranged in parallel than the second distinct configuration, and the second distinct configuration having a deeper pipeline depth than the first distinct configuration,
    wherein subject data to be processed by the computer processor includes image data, the first configuration being used for executing a first type of image processes having no necessity for feed-forward of data calculations whilst the second configuration is used for executing a second type of image processes having a necessity for feed-forward of data calculations.

2. A computer processor according to claim 1 wherein said communication means forms logical connections between said processing units and said first and second configurations comprise logical configurations of said common bus.

3. A computer processor according to claim 1, wherein said common bus includes a data bus configurable to selectively interconnect the processing units into at least the first and second distinct configurations.

4. A computer processor according to claim 3, wherein each of the processing units includes control means for selecting one of a plurality of data reception and transmission modes, the first and second distinct configurations being selectable by altering a control signal provided to each control means by an instruction controller associated with said computer processor.

5. A computer processor according to claim 3, wherein the data bus is a packet-based bus and each of said processing units is adapted to place data on and take data from the packet-based bus, the first and second configurations being selectable by manipulating packet addressing on the packet-based bus.

6. A computer processor according to claim 1, wherein program instructions included in the computer program are provided to said processing units in a variable length Very Long Instruction Word (VLIW) format, the configuration of said computer processor being dynamically selected based upon the length of the VLIW instructions.

7. A computer processor according to claim 6, wherein the configuration of said computer processor is executed in accordance with a program compiler.

8. A computer processor according to claim 1, wherein subject data to be processed by said computer processor includes image data, and the first configuration is used for processing the image data whilst the second configuration is used for processing other data included in the subject data.

9. A computer processor according to claim 1, wherein said first type of image processes comprises one of graphic composition, colour space conversion and convolution, and said second type of image processes comprises one of filtering and error diffusion.

10. A computer processor according to claim 1 wherein said processing units each comprise an SIMD arrangement.

11. A computer processor according to claim 10 wherein data to be processed by said computer processor comprises image data and said computer processor comprises at least one said SIMD arrangement for each colour component of said image data.

12. A method of data processing using a computer processor having a plurality of processing units interconnected by a common bus forming at least part of communication means by which packetized information is communicated between said processing units, said method comprising the step of:
    dynamically configuring said communication means according to a processing of a computer program to thereby selectively arrange communication paths for said packetized information between said processing units in a plurality of configurations having a different number of said processing units arranged in parallel and a different number of said processing units arranged in pipelined layers,
    wherein subject data to be processed by the computer processor includes image data, and a configuration used for executing a first type of image processes having no necessity for feed-forward of data calculations has a larger number of said processing units arranged in parallel and a smaller number of pipelined layers than a configuration used for executing a second type of image processes having a necessity for feed-forward of data calculations.

13. A method according to claim 12, wherein subject data to be processed by the computer processor includes image data, and a configuration used for processing the image data has a larger number of said processing units arranged in parallel and a smaller number of pipelined layers than a configuration used for processing other data included in the subject data.

14. A method according to claim 12, wherein said first type of image processes includes one of graphic composition, colour space conversion and convolution, and said second type of the image processes includes one of filtering and error diffusion.

15. A computer processor comprising:
a plurality of processing units; and
communication means by which the plurality of processing units are interconnected,
said communication means being dynamically configurable based on a processing of a computer program to thereby selectively arrange communication paths between the processing units in at least first and second distinct configurations, the first distinct configuration having a larger number of the processing units arranged in parallel than the second distinct configuration, and the second distinct configuration having a deeper pipeline depth than the first distinct configuration, wherein subject data to be processed by the computer processor includes image data, the first configuration being used for executing a first type of image processes having no necessity for feed-forward of data calculations whilst the second configuration is used for executing a second type of image processes having a necessity for feed-forward of data calculations.

16. A method of data processing using a computer processor having a plurality of processing units interconnected by communication means, said method comprising the step of:
dynamically configuring said communication means according to a processing of a computer program to selectively arrange communication paths between said processing units in a plurality of configurations having a different number of said processing units arranged in parallel and a different number of said processing units arranged in pipelined layers, wherein the subject data to be processed by the computer processor includes image data, and a configuration used for executing a first type of image processes having no necessity for feed-forward of data calculations has a larger number of said processing units arranged in parallel and a smaller number of pipelined layers than a configuration used for executing a second type of image processes having a necessity for feed-forward of data calculations.

* * * * *